US011808890B2

(12) United States Patent
Otsuka et al.

(10) Patent No.: US 11,808,890 B2
(45) Date of Patent: Nov. 7, 2023

(54) DISTANCE MEASURING DEVICE AND METHOD OF MEASURING DISTANCE BY USING THE SAME

(71) Applicant: SAMSUNG ELECTRONICS CO., LTD., Suwon-si (KR)

(72) Inventors: Tatsuhiro Otsuka, Suwon-si (KR); Jungwoo Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 695 days.

(21) Appl. No.: 16/825,234

(22) Filed: Mar. 20, 2020

(65) Prior Publication Data

US 2021/0088631 A1      Mar. 25, 2021

(30) Foreign Application Priority Data

Sep. 25, 2019     (KR) .................. 10-2019-0118377

(51) Int. Cl.
*G01S 17/26*        (2020.01)
*G01S 7/481*        (2006.01)
*G01S 7/484*        (2006.01)
*G01S 7/4865*       (2020.01)

(52) U.S. Cl.
CPC ............ *G01S 7/4817* (2013.01); *G01S 7/484* (2013.01); *G01S 7/4815* (2013.01); *G01S 7/4865* (2013.01); *G01S 17/26* (2020.01)

(58) Field of Classification Search
CPC ............................ G01S 7/4815; G01S 7/4817
See application file for complete search history.

(56) References Cited

U.S. PATENT DOCUMENTS

| | | | |
|---|---|---|---|
| 2013/0229668 A1* | 9/2013 | Werber | G02B 6/2726 385/11 |
| 2014/0036071 A1 | 2/2014 | Nakamura et al. | |
| 2018/0120441 A1 | 5/2018 | Elooz et al. | |
| 2019/0079166 A1 | 3/2019 | Kim et al. | |
| 2019/0094346 A1 | 3/2019 | Dumoulin et al. | |
| 2019/0101627 A1 | 4/2019 | Hansson et al. | |
| 2020/0049819 A1 | 2/2020 | Cho et al. | |
| 2020/0103504 A1* | 4/2020 | Talty | G01S 7/4817 |
| 2021/0096261 A1* | 4/2021 | Angus | G02F 1/292 |

FOREIGN PATENT DOCUMENTS

| | | |
|---|---|---|
| JP | 6000074 B2 | 9/2016 |
| JP | 6292772 B2 | 3/2018 |

OTHER PUBLICATIONS

Communication dated Nov. 11, 2020, from the European Patent Office in counterpart European Application No. 20178540.9.

\* cited by examiner

*Primary Examiner* — Jerry T Jean Baptiste
(74) *Attorney, Agent, or Firm* — Sughrue Mion, PLLC

(57) ABSTRACT

Provided are a light detection and ranging (LiDAR) device and a method using the same. The LiDAR device includes a light scanner configured to periodically scan a region in a surrounding area by sequentially changing a traveling path of incident light; a first light source configured to provide a first light to the light scanner in a first incidence direction; and a second light source configured to provide a second light to the light scanner in a second incidence direction different from the first incidence direction.

22 Claims, 18 Drawing Sheets

DISTANCE MEASURING DEVICE AND METHOD OF MEASURING DISTANCE BY USING THE SAME

CROSS-REFERENCE TO RELATED APPLICATION(S)

This application is based on and claims priority under 35 U.S.C. § 119(a) to Korean Patent Application No. 10-2019-0118377, filed on Sep. 25, 2019, in the Korean Intellectual Property Office, the disclosure of which is incorporated herein in its entirety by reference.

BACKGROUND

1. Field

The disclosure relates to distance measuring devices for measuring a distance, and methods of measuring a distance by using the same.

2. Description of the Related Art

Recently, 3D cameras and light detection and ranging (LIDAR) techniques for measuring a distance to an object have been studied. One of the distance measuring techniques is a time of flight (TOF) method whereby a time for light to travel between an object and a camera is measured. The TOF method has a function of measuring a distance (hereinafter, a depth image) between an image capturing device and an object.

The TOF method basically includes processes of radiating light of a specific wavelength, for example, a near-infrared ray (850 nm), to an object, by using a light-emitting diode (LED) or a laser diode (LD), measuring or capturing an image corresponding to the light of the specific wavelength reflected by the object by using a photodiode or a camera, and extracting a depth image from the measured or captured image. Various TOF methods with respect to optical processing, that is, a series of processes including light radiation, reflection at the object, optical modulation, image capture, and processing have been disclosed. However, methods to more accurately measure a distance to an object in an improved manner are ongoing.

SUMMARY

Provided are a light detection and ranging (LiDAR) device capable of improving crosstalk and a method using the LiDAR device to more accurately measure a distance to an object.

Additional aspects will be set forth in part in the description which follows and, in part, will be apparent from the description, or may be learned by practice of the presented embodiments of the disclosure.

According to an aspect of the embodiment, there is provided a Light Detection And Ranging (LiDAR) device comprising: a light scanner configured to periodically scan a region in a surrounding area by sequentially changing a traveling path of incident light; a first light source configured to provide first light to the light scanner in a first incidence direction; and a second light source configured to provide second light to the light scanner in a second incidence direction different from the first incidence direction, and wherein the light scanner is further configured to scan the region in the surrounding area a plurality of times during one scan period of the light scanner using the first light and second light.

The first light source and the second light source may be configured to intermittently provide the first and second lights to the light scanner.

The first light source and the second light source may be configured to provide the first light and second light to the light scanner simultaneously or alternately.

The light scanner may be further configured to sequentially change the traveling path of the incident light by rotating the light scanner with respect to a central axis of the light scanner.

A scan period of the light scanner may be less than or equal to a rotation period of the light scanner.

The light scanner may comprise a plurality of reflective surfaces, each of the plurality of reflective surfaces may be parallel to a central axis of the light scanner or may be inclined with respect to the central axis of the light scanner.

A first reflective surface of the plurality of reflective surfaces may have a first tilt angle, and a second reflective surface of the plurality of reflective surfaces may have a second tilt angle that is different from the first tilt angle.

Adjacent reflective surfaces among the plurality of reflective surfaces may have different tilt angles.

The second light source may be configured to emit the second light to a second reflective surface different from a first reflective surface among the plurality of reflective surfaces, while the first light source is configured to provide the first light to the first reflective surface among the plurality of reflective surfaces.

The first reflective surface may scan a first sub-region of the region in the surrounding area by reflecting the first light sequentially in different directions, and the second reflective surface may scan a second sub-region of the region in the surrounding area different from the first sub-region by reflecting the second light sequentially in different directions.

The first sub-region and the second sub-region may not overlap each other.

The first sub-region and the second sub-region may be arranged in parallel with a rotation axis of the light scanner.

The LiDAR device may further comprise: a light receiver configured to detect third light reflected in the region of the surrounding area from the first light and fourth light reflected in the region of the surrounding area from the second light; and a processor configured to obtain a frame comprising depth information of the region of the surrounding area by using a result of detection from the light receiver.

The processor may be further configured to obtain a first initial frame comprising the depth information of the region of the surrounding area corresponding to the first light and a second initial frame comprising the depth information of the region of the surrounding area corresponding to the second light in the result of detection from the light receiver and obtain the frame using the first and second initial frames.

The processor may be further configured to obtain the frame by applying a correlation to the first and second initial frames.

The processor may be further configured to: obtain a third initial frame comprising the depth information of the region in the surrounding area by using the result of detection from the light receiver during a first time, obtain a fourth initial frame comprising the depth information of the region in the surrounding area by using the result of detection from the light receiver during a second time that is subsequent to the first time, and obtain the frame using the third and fourth initial frames.

Each of the third and fourth initial frames may comprise depth information corresponding to both the first light and second light.

A magnitude of the first and second times may be equal to a ½ scan period of the light scanner.

According to another aspect of the embodiment, there is provided a method of operating a Light Detection And Ranging (LiDAR) device, the method comprising: providing first light and second light to a light scanner; and scanning, by the light scanner, a region in a surrounding area a plurality of times with the first light and second light during one scan period of the light scanner by sequentially changing traveling paths of the first and second lights, wherein the scanning comprises scanning a second sub-region of the region in the surrounding area that does not overlap a first sub-region of the region in the surrounding area with the second light while scanning the first sub-region of the region in the surrounding area with the first light.

The scanning may further comprise scanning the second sub-region with the first light while scanning the first sub-region with the second light.

The providing may comprise providing the first light to the light scanner in a first incidence direction, and providing the second light to the light scanner in a second incidence direction different from the first incidence direction.

The providing may comprise providing the first light and second light to the light scanner simultaneously or alternately.

The method may further comprise detecting third light reflected in the region in the surrounding area from the first light and fourth light reflected in the region in the surrounding area from the second light; and obtaining a frame comprising depth information of the region in the surrounding area by using a result of detection.

The obtaining of the frame may comprise: obtaining a first initial frame comprising the depth information of the region in the surrounding area corresponding to the first light and a second initial frame comprising the depth information of the region in the surrounding area corresponding to the second light in the result of detection; and obtaining the frame using the first and second initial frames.

The frame may be obtained by applying a correlation to the first and second initial frames.

According to another aspect of the embodiment, there is provided an apparatus comprising: a memory configured to store one or more instructions; and a processor configured to execute the one or more instructions to: detect first reflected light reflected in a region in a surrounding area from first emitted light; detect second reflected light reflected in the region in a surrounding area from second emitted light; obtain a frame comprising depth information of the region in the surrounding area based on the detected first reflected light and the detected second reflected light.

The processor may be further configured to: obtain a first initial frame comprising depth information of the region in the surrounding area corresponding to the first reflected light; obtain a second initial frame comprising the depth information of the region in the surrounding area corresponding to the second reflected; and obtain the frame based on the first and second initial frames.

The processor may be further configured to obtain the frame by applying a correlation to the first and second initial frames.

The processor may be further configured to: output a first signal to control a light scanner to periodically scan the region in the surrounding area a plurality of times during one scan period of a light scanner by sequentially changing a traveling path of incident of the first and second lights; output a second signal to control a first light source provide the first emitted light to the light scanner in a first incidence direction; and output a second signal to control a first light source provide the first emitted light to the light scanner in a first incidence direction.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE INVENTION

Hereinafter, certain embodiments will be described in detail with reference to the accompanying drawings. It is to be understood that the following description is intended to illustrate the certain embodiments and not to restrict or limit the scope of the disclosure. It is interpreted that those skilled in the art may easily deduce from the detailed description and the embodiments falls within the scope of the disclosure.

As used herein, the term 'and/or' includes any and all combinations of one or more of the associated listed items. Expressions such as 'at least one of,' when preceding a list of elements, modify the entire list of elements and do not modify the individual elements of the list.

As used herein, the terms 'comprising' or 'including' and the like should not be construed as necessarily including the various elements or operations described in the specification, and it should be understood that some of the elements or some of the operations may not be included, or that additional elements or operations may be further included. As used herein, the terms "unit", "module", etc. should be understood as units for processing at least one function or operation and may be embodied as hardware, software, or a combination thereof.

Although the terms 'first', 'second', etc., may be used herein to describe various components, these components should not be limited by these terms. These terms are only used to distinguish one component from another component.

Figure 1:
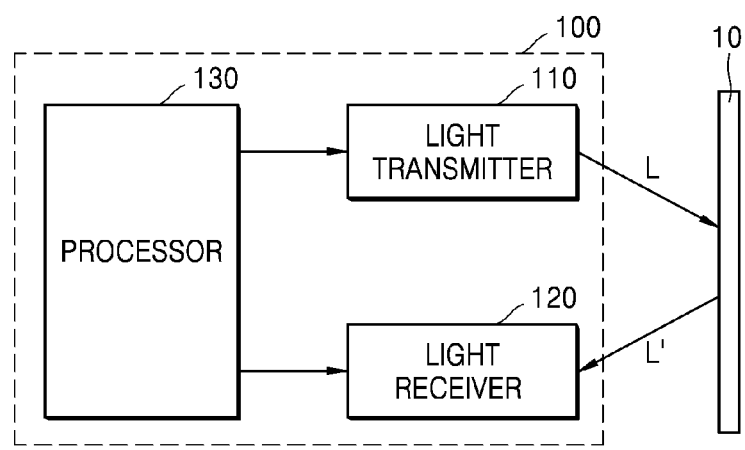
FIG. 1 is a block diagram illustrating an example of a light detection and ranging (LiDAR) device according to an embodiment.

FIG. 1 is a block diagram illustrating an example of a light detection and ranging (LiDAR) device 100 according to an embodiment.

The LiDAR device 100 may be utilized as a sensor that obtains three-dimensional (3D) information, such as distance information about an object 10, in real time. For example, the LiDAR 100 may be applied to or used in an unmanned vehicle, an autonomous driving car, a robot, and a drone. Referring to FIG. 1, the LiDAR device 100 may include a light transmitter 110 that radiates light L to a surrounding area, a light receiver 120 that receives the light L' reflected from the surrounding area of the light radiated to the surrounding area, and a processor 130 that obtains a frame including the distance information about the object 10 present in the surrounding area by using an electrical signal corresponding to the received light. According to an embodiment, the received light L' corresponds to the light L from the light transmitter 110 irradiated on object 10.

The LiDAR device 100 may be implemented as a housing, or may be implemented as a plurality of housings. When the LiDAR device 100 is implemented as the plurality of housings, a plurality of elements may be connected in a wired manner or may be connected wirelessly. For example, the LiDAR device 100 may be divided into a first device including the light transmitter 110 and the light receiver 120 and a second device including the processor 130. The LiDAR device 100 may also be implemented as an element of a device for performing another function, for example, an autonomous driving device.

While only elements that are related to certain embodiments of the disclosure are shown in the LiDAR device 100 of FIG. 1, it will be understood by one of ordinary skill in the art that general-use elements other than the elements illustrated in FIG. 1 may be further included. For example, the LiDAR device 100 may further include a memory or a communication interface.

According to an embodiment, the memory is hardware that stores various data processed in the LiDAR device 100. For example, the memory may store data processed and data to be processed in the LiDAR device 100. In addition, the memory may store applications, drivers, etc. to be driven by the LiDAR device 100.

The memory is may be a random access memory (RAM) such as a dynamic random access memory (DRAM), a static random access memory (SRAM), etc., a read-only memory (ROM), an electrically erasable programmable read-only memory (EEPROM), CD-ROM, Blu-ray or other optical disk storage, a hard disk drive (HDD), a solid state drive (SSD), or a flash memory, and further, may include other external storage devices that may be accessed to the LiDAR device 100.

According to an embodiment, the communication interface may include one or more hardware components that facilitate communication between the LiDAR device 100 and an external device.

Figure 2:
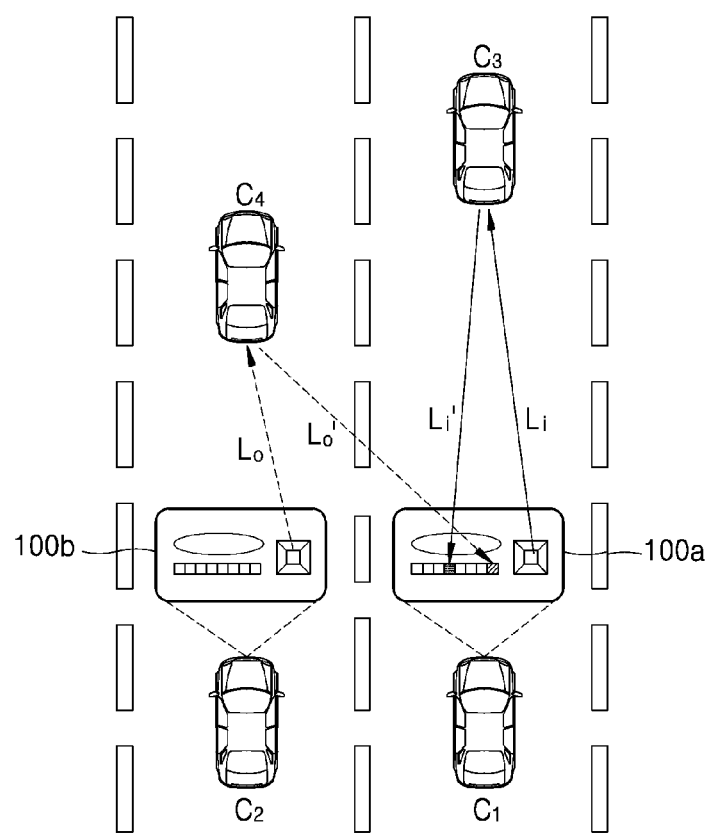
FIG. 2 is a diagram illustrating an example scenario in which a LiDAR device operates.

FIG. 2 is a diagram illustrating an example scenario in which a LiDAR device 100a operates. The LiDAR device 100a may radiate light $L_i$ to a surrounding area. Subsequently, the radiated light $L_i$ may be reflected from an object C3 present in the surrounding area, and the LiDAR device 100a may detect the reflected light $L_i'$.

Meanwhile, the LiDAR device 100a may detect not only the light radiated by the LiDAR device 100a and reflected to the LiDAR device 100a but other light $L_0'$ incident from the outside. When the other light $L_0'$ is different in wavelength from the light $L_i$ radiated from the LiDAR device 100a, the other light $L_0'$ may be easily removed by a frequency band filter. However, when the light $L_0'$ is light emitted from another LiDAR device 100b and is similar in light characteristics to the LiDAR device 100a according to an embodiment, it may be difficult to remove the light $L_0'$ by a frequency band filter, and the light $L_0'$ may cause a crosstalk phenomenon to occur.

The LiDAR device 100 according to an embodiment may obtain a frame with the improved crosstalk by scanning the surrounding area using a plurality of lights.

Figure 3:
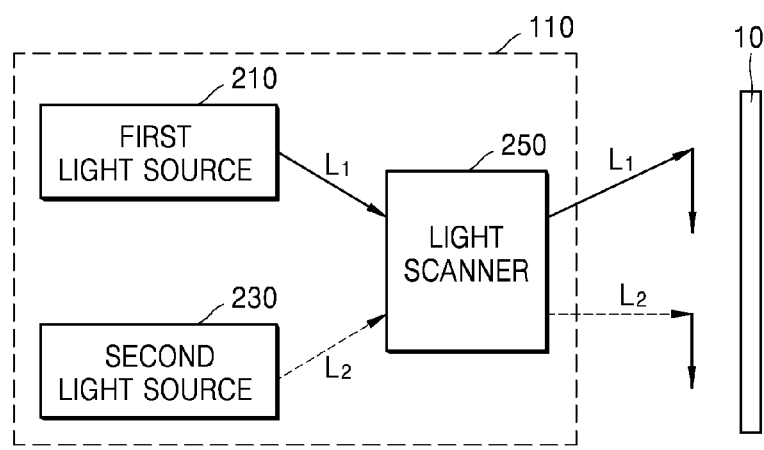
FIG. 3 is a block diagram illustrating a light transmitter that radiates a plurality of lights according to an embodiment.

FIG. 3 is a block diagram illustrating the light transmitter 110 that radiates a plurality of lights according to an embodiment. Referring to FIG. 3, the light transmitter 110 of the LiDAR device 100 may include a first light source 210 that provides first light $L_1$, a second light source 230 that provides second light $L_2$, and a light scanner 250 that periodically scans a surrounding area by sequentially changing the traveling paths of the incident lights $L_1$ and $L_2$ over time.

Each of the first light source 210 and the second light source 230 may be a device that radiates light in an infrared light region. When the light in the infrared light region is used, the light in the infrared region may be prevented from mixing with a natural light in a visible light region including sunlight. However, the disclosure is not necessarily limited thereto, and the light transmitter 110 may include a light source that radiates light of various wavelength bands, or may radiate light of a plurality of different wavelength bands. In addition, the light transmitter 110 may radiate a pulsed light or a continuous light.

Each of the first light source 210 and the second light source 230 may include a light source such as a laser diode (LD), an edge emitting laser, a vertical-cavity surface emitting laser (VCSEL), a distributed feedback laser, a light emitting diode (LED), and a super luminescent diode (SLD), but is not limited thereto.

According to an embodiment, the first light source 210 and the second light source 230 may radiate or provide the light scanner 250 with light having the same light characteristics, or may radiate or provide the light scanner 250 with light having different light characteristics. Here, the light characteristic may mean a waveform of the light, a period, a duty ratio, etc. For example, the first light source 210 and the second light source 230 may provide first pulse type light $L_1$ and second pulse type light $L_2$. The first light $L_1$ and second light $L_2$ may have the same pulse period but different duty ratios.

According to an embodiment, the first light source 210 and the second light source 230 may provide the first and second lights $L_1$ and $L_2$ to the light scanner 250 simultaneously and alternately.

According to an embodiment, the first light source 210 and the second light source 230 may provide the first light $L_1$ and the second light $L_2$ to the light scanner 250 in different incidence directions. According to another embodiment, first light source 210 and the second light source 230 may provide the first light $L_1$ and the second light $L_2$ having different phases to the light scanner 250. Thus, the light scanner 250 may scan different regions of a surrounding area by differently changing the traveling paths of the first and second lights $L_1$ and $L_2$.

The light scanner 250 may scan a specific range of the surrounding area by sequentially changing the traveling paths of the first light $L_1$ and the second light $L_2$ provided from the first light source 210 and the second light source 230 over time. The specific range may be predetermined. The specific range may be determined by the light steering angle of the light scanner 250 as a scan range that the light scanner 250 may scan. The light scanner 250 may change the traveling paths of the first light $L_1$ and the second light $L_2$ by reflecting the first light $L_1$ and the second light $L_2$ that are incident or by modulating the phases of the first light $L_1$ and the second light $L_2$. According to an embodiment, during one scan period, the light scanner 250 may scan a scan range 11 (as shown in FIG. 4) twice using the first light $L_1$ and the second light $L_2$.

While two lights are illustrated according to an embodiment in FIG. 3, the disclosure is not limited thereto. The LiDAR device 100 according to another embodiment may provide three or more lights. In addition, the light scanner 250 may scan a predetermined range, i.e., the scan range 11, by the number of lights provided during one scan period. For example, when three lights are provided to the light scanner 250, the light scanner 250 may scan the scan range 11 three times during one scan period. According to another embodiment, when M number of lights are provided, the light scanner 250 may scan the scan range 11 M times during one scan period, where M is a natural number.

Figure 4:
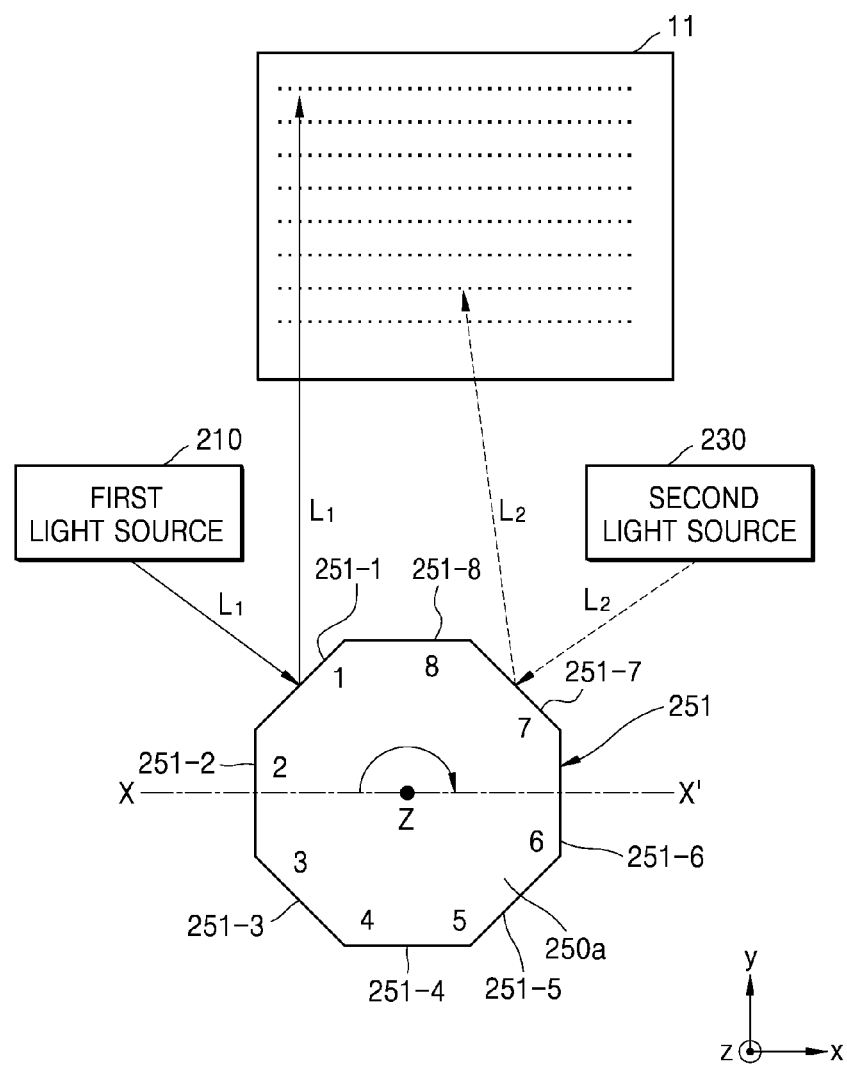
FIG. 4 is a reference view illustrating a mechanical light scanner according to an embodiment.

FIG. 4 is a reference view illustrating a mechanical light scanner 250a according to an embodiment. As shown in FIG. 4, the light scanner 250a may have an asymmetric shape with respect to the central axis (z axis) of the light scanner 250a. For example, the light scanner 250a may include a plurality of reflective surfaces 251 (251-1 to 251-8) parallel to or inclined to the central axis (z axis) with respect to the central axis (z axis). At least two of the plurality of reflective surfaces 251 may have different tilt angles with respect to the central axis (z axis). For example, the adjacent reflective surfaces 251-1 and 251-7 among the plurality of reflective surfaces 251 may have different tilt angles with respect to the central axis (z axis). Alternatively, each of the plurality of reflective surfaces 251 may have a different tilt angle.

The light scanner 250a may scan a surrounding area by rotating around the center axis. The scan period of the light scanner 250a may be determined by the rotation period of the light scanner 250a. For example, the scan period of the light scanner 250a may be the same as the rotation period of the light scanner 250a, but is not limited thereto. The scan period of the light scanner 250a may be 1/N of the rotation period of the light scanner 250a. N may be the number of the reflective surfaces 251 having the same tilt angle, where N is a natural number.

Figure 5A:
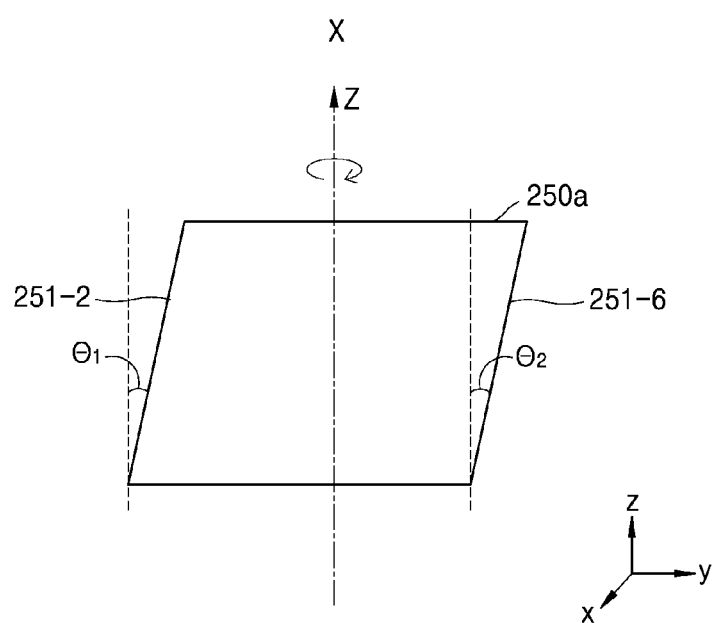
FIG. 5A is a cross-sectional view of the light scanner of FIG. 4.
Figure 5B:
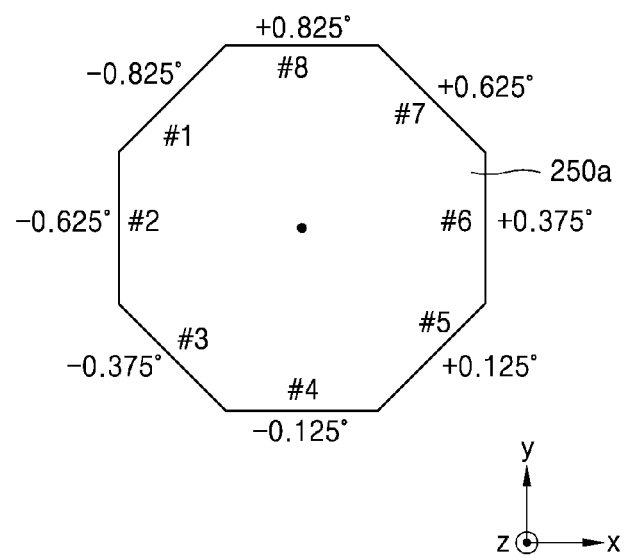
FIG. 5B is a diagram illustrating an example of the tilt angle of a reflective surface included in the light scanner of FIG. 4.

FIG. 5A is a cross-sectional view of the light scanner 250a of FIG. 4, and FIG. 5B is a diagram illustrating an example of the tilt angle of the reflective surface 251 of the light scanner 250a. As shown in FIGS. 5A and 5B, a cross section parallel to the central axis (z axis) of the light scanner 250a may have a columnar shape, but is not limited to thereto. The cross section parallel to the central axis (z axis) of the light scanner 250a may be a horn shape, etc. The cross section of the light scanner 250a perpendicular to the central axis (z axis) may be polygonal but is not limited to thereto. The cross section of the light scanner 250a perpendicular to the central axis (z axis) may include a curve. At least two of the reflective surface 251-2 and 251-6 of the light scanner 250a may have different tilt angles 81 and % with respect to the central axis (z axis). Moreover, each of the reflective surfaces 251—of the light scanner 250a may have a different tilt angle with respect to the center axis (z axis) as illustrated in FIG. 5B.

The reflective surfaces 251 of the light scanner 250a may be formed using a material having high reflectance. Available materials may include high reflectivity white resin, metal, and reflective paint, etc. The white resin may include a white foamed PET material, a white POLYCARBONATE material, etc. The material may have reflectance of about 97% and have a low efficiency reduction because of a small reflection loss of light. As the metal, at least one selected from the group consisting of high reflectivity metals such as Ag, Al, Au, Cu, Pd, Pt, and Rd and alloys thereof may be used. The reflective surface 251 may be formed by vapor deposition. Alternatively, as the reflective paint, reflective materials having the reflectance of about 80% to about 90% such as titanium oxide ($TiO_2$), zinc oxide (ZnO), and calcium carbonate ($CaCO_3$) may be used alone or in combination. Such a reflective paint may be formed by diluting in a solvent with an adhesive and being coated onto a material such as plastic. As a coating method, a spray, a roller, etc. may be used.

According to an embodiment, because the tilt angles of at least two of the reflective surface 251 of the light scanner 250a are different from each other, even if the light is incident in a constant incident direction, the traveling path of the light reflected by the rotation of the light scanner 250 may change. The light incident on the specific reflective surface 251 may be reflected by the specific reflective surface 251 according to the rotation of the light scanner 250 to scan a region within the scan range 11 in a direction perpendicular to the central axis (z axis) of the light scanner 250.

According to an embodiment, because the reflective surface 251 rotates by the rotation of the light scanner 250a, the light may be incident on a reflective surface 251 having a different tilt angle. Accordingly, the light scanner 250a may change the traveling path of the incident light by the central axis (z axis) of the light scanner 250a in response to a change in the tilt angle. Thus, the reflected light may scan different regions parallel to the central axis (z axis) of the light scanner 250a within the scan range 11.

The scan range 11 of the light scanner 250a may be determined by a range of the tilt angle and the direction in which light is incident from a light source. The spatial resolution of the light scanner 250a may be determined by the light driving period of the light source, the wavelength of the light, the scan period of the light scanner 250a, the number of the reflective surfaces 251, and the time resolution of the light scanner 250a may be determined by the number of lights, the scan period of the light scanner 250a, etc.

Meanwhile, the first light source 210 may radiate first light L1 to the light scanner 250a in a first incident direction, and the second light source 230 may radiate second light L2 to the light scanner 250a in a second incident direction different from the first incident direction. For example, when the first light source 210 radiates the first light L1 to the first reflective surface 251-1 of the light scanner 250a, the second light source 230 may radiate the second light L2 to a seventh reflective surface 251-7 different from the first reflective surface 251-1 of the light scanner 250a. The traveling path of the first light L1 reflected by the first reflective surface 251-1 and the traveling path of the second light L2 reflected by the seventh reflective surface 251-7 may be different from each other. That is, the first light L1 and the second light L2 may scan different regions within the scan range 11 in vertical directions $S_1$ and $S_2$.

Figure 6A:
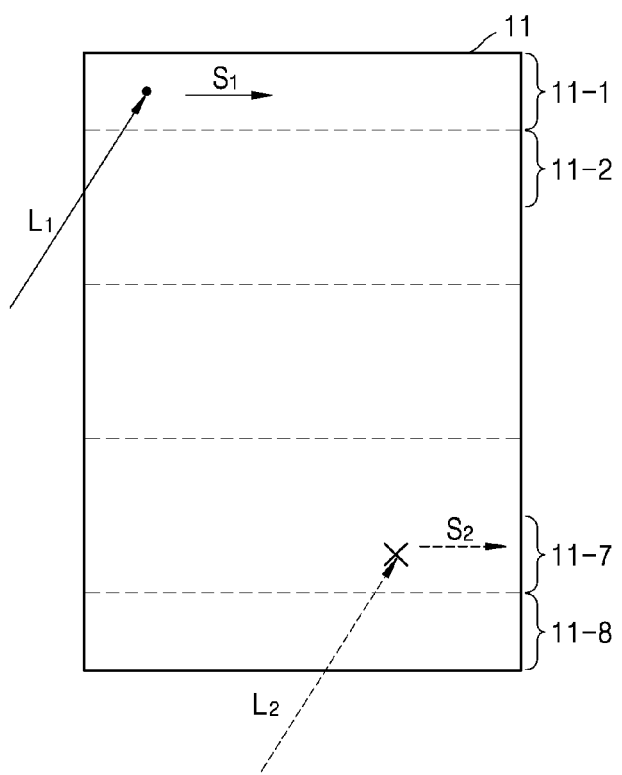
FIGS. 6A, 6B and 6C are reference views illustrating a scanning method performed by a light scanner during one scan period according to an embodiment
Figure 6B:
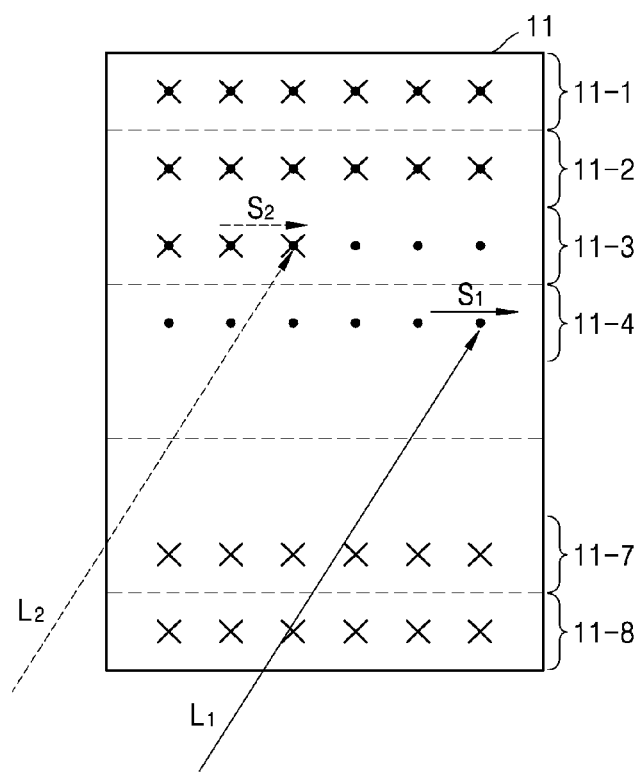
Figure 6C:
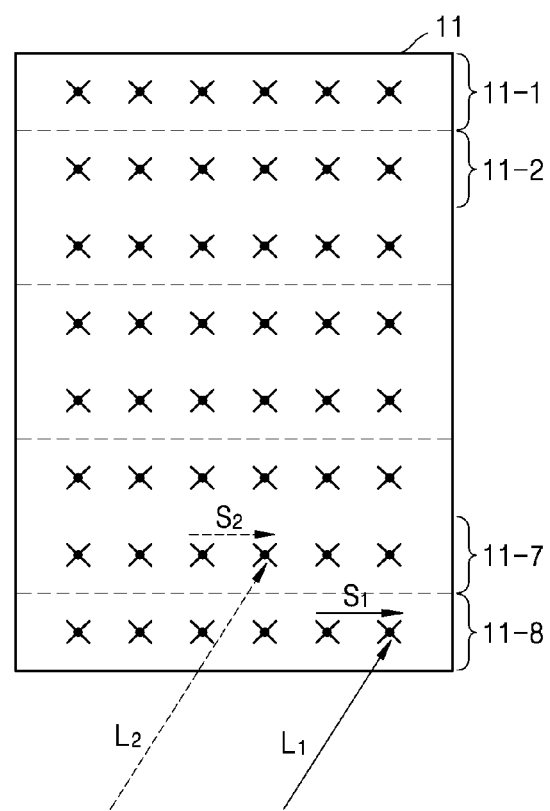

FIGS. 6A, 6B and 6C are reference views illustrating a scanning method performed by the light scanner 250a during one scan period according to an embodiment. According to an embodiment, the light scanner 250a may divide the scan range into a plurality of regions and scan the scan range 11 in the vertical direction. According to an embodiment, the number of regions divided and scanned by the light scanner 250a may be determined by the number of the reflective surfaces 251. Which region of the split regions the light scanner 250a scans may be determined by the tilt angle of the reflective surface 251 of the light scanner 250a, the incident direction of the light incident on the reflective surface 251, etc.

For example, when the light scanner 250a includes eight reflective surfaces 251 having different tilt angles, the light scanner 250a may divide the san range 11 into eight regions and scan the eight regions. The tilt angles of the first to eighth reflective surfaces 251-1, ..., 251-8 may be set such that the first to eighth reflective surfaces 251-1, ..., 251-8 may scan first to eighth regions 11-1, ..., 11-8 respectively. The tilt angles of the first to eighth reflective surfaces 251-1, ..., 251-8 may be preset such that the first to eighth reflective surfaces 251-1, ..., 251-8 may scan first to eighth regions 11-1, ..., 11-8 respectively.

The first light source 210 may provide the first light L1 to the first reflective surface 251-1 of the light scanner 250a, and the second light source 230 may provide the second light L2 to the seventh reflective surface 251-7 of the light scanner 250a such that the light scanner 250 may perform a scan operation. The light scanner 250 may start scanning the first region 11-1 with the first light L1 and start scanning the seventh region 11-7 with the second light L2.

When the light scanner 250 rotates such that the first light L1 is provided to the second reflective surface 251-2 and the second light L2 is provided to the eighth reflective surface 251-8, the light scanner 250 may scan the second region 11-2 with the first light L1 and the eighth region 11-8 with the second light L2. When the light scanner 250 rotates during a ½ scan period, as shown in FIG. 6B, the light scanner 250 may sequentially scan the first region 11-1 to the fourth region 11-4 with the first light 11 and may sequentially scan the seventh region 11-7 to the third region 11-3 with the second light L2.

According to an embodiment, when the light scanner 250 rotates during one scan period, as shown in FIG. 6C, the light scanner 250 may scan the entire scan range 11 from the first region 11-1 to the eight region 11-8 with the first light L1, and may scan the entire scan range 11 starting from the seventh region 11-7 to finishing at the sixth region 11-6 with the second light L2. Accordingly, even if only one light scanner 250 is provided, when a plurality of lights are provided, the light scanner 250 may scan the scan range 11 a plurality of times during one scan period.

In FIG. 4, the light scanner 250a scans the surrounding area by mechanical movement, but is not limited thereto. The light scanner 250a may scan the surrounding area by an electrical signal. For example, the light scanner 250 may include an optical phased array that changes a phase of incident light to change the path of travel of the light. The light scanner 250 may include the an optical phased array including a plurality of channels that modulates the phase of the incident light and a signal inputter that applies a modulation signal to each of the plurality of channels.

Figure 7:
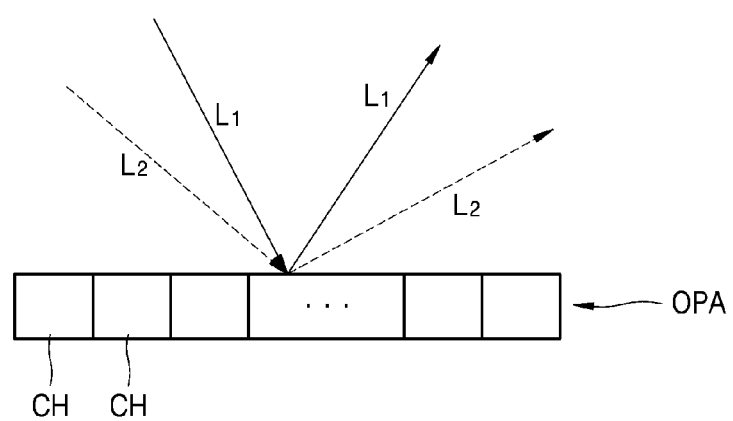
FIG. 7 is a diagram illustrating a light scanner including an optical phased array according to an embodiment.

FIG. 7 is a diagram illustrating a light scanner including an optical phased array OPA according to an embodiment. Referring to FIG. 7, the optical phased array OPA may include a plurality of channels CH. A phase change value used to change a phase of incident light may be set in each of the plurality of channels CH, and thus the direction in which the incident light is steered and emitted may be adjusted.

Each of the plurality of channels CH of the optical phased array OPA may include a meta device having a shape dimension of a sub wavelength through which a phase change value with respect to an incident light may be electrically adjusted.

Alternatively, the optical phased array OPA may be a silicon photonics-based optical waveguide that diverges a path of the incident light into a plurality of paths and directs the plurality of paths to respective output terminals, i.e., the plurality of channels CH. The optical waveguide may include a phase retarder provided in each of the diverged plurality of paths, and the direction in which the incident light is steered and emitted by adjusting the length of each path and/or the phase delay degree in the phase retarder of each path may be adjusted.

The optical phased array OPA may change the traveling path of light in the direction determined by a combination of phase change values that occur in each channel with respect to the incident light. According to the combination of the phase change values, the direction in which the incident light is steered and emitted may be sequentially adjusted.

Accordingly, even when the first light $L_1$ and the second light $L_2$ having different phases are incident on the optical phased array OPA, and phase modulation occurs by the same modulation signal of the first and second lights $L_1$ and $L_2$, because the phases of the first light $L_1$ and the second light $L_2$ are different from each other when incident, the first light $L_1$ and the second light $L_2$ may be emitted to a surrounding area through different traveling paths. Alternatively, a plurality of lights having different incidence directions may be incident on the optical phased array OPA such that the plurality of lights may be emitted to the surrounding area through different traveling paths.

Figure 8:
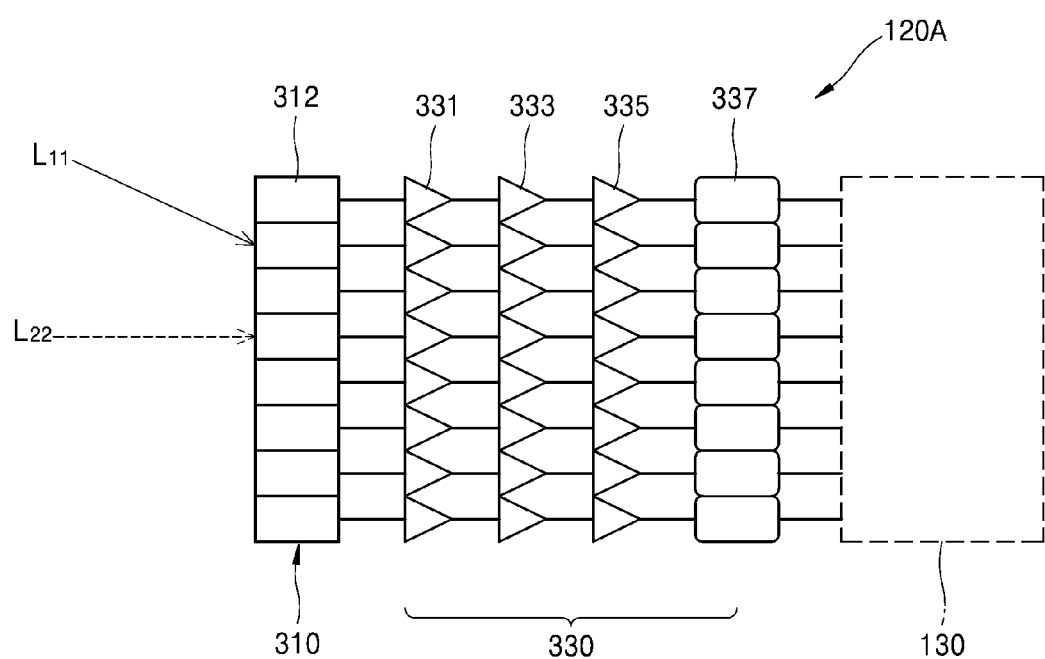
FIG. 8 is a diagram illustrating an example of a light receiver according to an embodiment.

FIG. 8 is a diagram illustrating an example of a light receiver 120a according to an embodiment.

According to an embodiment, the light receiver 120A may include a light detector 310 that converts light reflected by a target point of the scan range 11 of the surrounding area, corresponding to in the first light $L_1$ and the second light $L_2$ that scan the surrounding area, into an electrical signal, for example, a current. In the first light $L_1$, a first light reflected or scattered by the target point, that is, the first light including information about the target point may be referred to as first target light $L_{11}$. In the second light $L_2$, a second light reflected or scattered by the target point, that is, the second light including information about the target point may be referred to as second target light $L_{22}$. The light detector 310 may detect the first target light $L_{11}$ to output a first target signal that is an electrical signal, and detect the second target light $L_{22}$ to output a second target signal that is an electrical signal.

The light detector 310 may be arranged in a plurality of pixels in the form of an array. The plurality of pixels may be arranged in the form of a matrix. It may be determined whether the electrical signal detected based on a position of a detected pixel among the pixels, the detected electrical signal, scan information of the light scanner 250, and the optical characteristics of the first light $L_1$ and the second light $L_2$ is the first target signal corresponding to the first target light $L_{11}$ or is the second target signal corresponding to the second target light $L_{22}$.

Each of the pixels may be a light receiving device operating in a state where a bias voltage is applied. For example, the light detector 310 may include an avalanche photo diode (APD) or a single photon avalanche diode (SPAD). The light detector 310 may have differently a specific circuit configuration such as an analog front end (AFE), a time digital counter (TDC), etc. according to which light receiving device between the APD and the SPAD the light detector 310 includes. Such a specific circuit configuration may be a usual technique, and thus a detailed description thereof will be omitted.

The light receiver 120 may further include a current-voltage conversion circuit that converts the output current into a voltage and an amplifier that amplifies the amplitude of the voltage. In addition, the light receiver 120 may further include a lens that collects light reflected or scattered at the target point and a filter that filters an electric signal of a specific frequency, for example, a high pass filter.

The light receiver 120a may include the light detector 310 including a plurality of pixels 312 and a circuit 330 used to measure a time of flight (TOF) of light detected in each of the plurality of pixels 312.

According to an embodiment, the circuit 330 used to measure the TOF may include a plurality of current-voltage conversion circuits 331 that converts the current output from each of the plurality of pixels 312 into the voltage, a plurality of amplifiers 333 that amplifies the voltage converted by each of the plurality of current-voltage conversion circuits 331, a plurality of peak detectors 335 that detects peaks from signals amplified by the plurality of amplifiers 333, and a plurality of time counters 337 that determines the TOF using the peaks.

The plurality of current-voltage conversion circuits 331 may convert a current signal output from each of the plurality of pixels 312 into a voltage signal.

The plurality of amplifiers 333 may amplify the voltage signal converted by each of the plurality of current-voltage conversion circuits 331.

The plurality of peak detectors 335 may detect the peaks from the voltage signal amplified by each of the plurality of amplifiers 333. For example, the plurality of peak detectors 335 may detect the peaks by detecting the rising and falling edges of the electrical signal. In addition, the plurality of peak detectors 335 may detect the peaks using a constant fraction discriminator (CFD) method. The plurality of peak detectors 335 may further include a comparator and may output the detected peaks as pulse signals.

The plurality of time counters 337 may measure a flight time of light detected by each of the plurality of pixels 312. Each of the plurality of time counters 337 may calculate how many cycles a clock signal is generated from a light radiation time by a light source when the pulse signal output from each of the plurality of peak detectors 335 is input and may measure the TOF of the light. In addition, each of the plurality of time counters 337 may store information about each of the measured TOF of the light in a register. Each of the plurality of time counters 337 may be implemented as a time to digital converter (TDC).

The measurement result of the time counter 337 may be transmitted to the processor 130. The processor 130 may use the measurement result to obtain a frame with respect to the scan range 11. The result output from the light receiver 120 may be referred to as scanning data as data including distance information of each target point within the scan range 11. Data corresponding to the first target light $L_{11}$ may be referred to as first scanning data, and data corresponding to the second target light $L_{22}$ may be referred to as second scanning data.

The processor 130 may obtain a frame including depth information about the scan range 11 using the first and second scanning data output from the light receiver 120. The frame may be a combination of the first and second scanning data, may be corrected data of the first and second scanning data, or may be 3D shape modeled data based on the first and second scanning data.

The processor 130 may transmit the above frame to another unit external to the processor. For example, such frame information may be transmitted to a processor of an autonomous driving device such as an autonomous vehicle, a drone, etc., in which the LiDAR device 100 is employed. In addition, such frame information may be utilized in smart phones, mobile phones, personal digital assistants (PDAs), laptops, PCs, various wearable devices, and other mobile or non-mobile computing devices. Alternatively, the processor 130 according to an embodiment may be included in another device capable of communicating with the light receiver 120.

According to an embodiment, when obtaining the frame from the first and second scanning data, the processor 130 distinguishes between the first scanning data corresponding to the first light $L_1$ or the first target light $L_{11}$ and the second scanning data corresponding to the second light $L_2$ or the second target light $L_{22}$.

Figure 9:
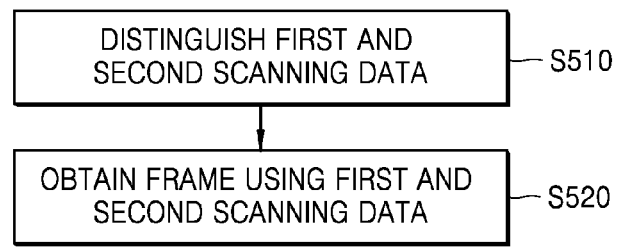
FIG. 9 is a diagram illustrating a method of obtaining a frame according to an embodiment.

FIG. 9 is a diagram illustrating a method of obtaining a frame according to an embodiment.

The processor 130 may distinguish whether data output from the light receiver 120 is first scanning data or second scanning data (S510). The processor 130 may determine whether an output signal corresponds to the first light $L_1$ or the second light $L_2$ based on of the position of a pixel that detected the first light $L_1$ or the second light $L_2$ of the light detector 310, the optical characteristics of the first and second lights $L_1$ and $L_2$, the incidence direction of the first and second lights $L_1$ and $L_2$, scan information (e.g., the tilt angle of the reflective surface 251, the scan period, the number of the reflective surfaces 251, etc.) of the light scanner 250, the driving information of the first and second lights $L_1$ and $L_2$, etc. For example, when the duty ratios of the first and second lights $L_1$ and $L_2$ are different from each other, the processor 130 may determine whether a detected electrical signal corresponds to the first light $L_1$ or the second light $L_2$ using the duty ratio of the detected electrical signal. Alternatively, when the first light $L_1$ and second light $L_2$ are alternately provided to the light scanner 250, the processor 130 may determine that the detected electrical signal is alternately received corresponding to the alternatively provided first light $L_1$ and second light $L_2$.

The processor 130 may obtain the frame from the first and second scanning data during one scan period of the light scanner 250 (S520). The processor 130 may obtain a first initial frame for the first light $L_1$ from the first scanning data during one scan period. The first free frame may include distance information about a target point within the scan range 11 during one scan period. Similarly, the processor 130 may obtain a second initial frame for the second light $L_2$ from the first scanning data during one scan period. The second free frame may include distance information about the target point within the scan range 11 during one scan period.

The processor 130 may obtain the frame using the first initial frame and the second initial frame. The processor 130 may obtain the frame by applying a correlation between the first initial frame and the second initial frame. For example, the processor 130 may apply a cross-correlation function to each corresponding target point of the first initial frame and the second initial frame, when a resultant value is equal to or greater than a reference value, determine the target point as an effective target point, and when the resultant value is less than the reference value, determine the target point as an ineffective target point. Alternatively, when a difference in the depth information of each corresponding target point between the first initial frame and the second initial frame is less than the reference value, the processor 130 may determine the target point as the effective target point, and when the difference is equal to or greater than the reference value, determine the target point as the ineffective target point. Alternatively, when a target point exists in one of the first and second initial frames but the target point does not exist in the other, the processor 130 may determine the target point as the ineffective target point.

In addition, the processor 130 may obtain a frame including depth information of effective target points. When the effective target point is the same point within the scan range 11, the processor 130 may obtain the frame to include an average value of the depth information of the effective target points. The target points of the first and second initial frames may not match. When the target points of the first and second initial frames do not match, the processor 130 may obtain the frame including the depth information of each effective target point.

Figure 10:
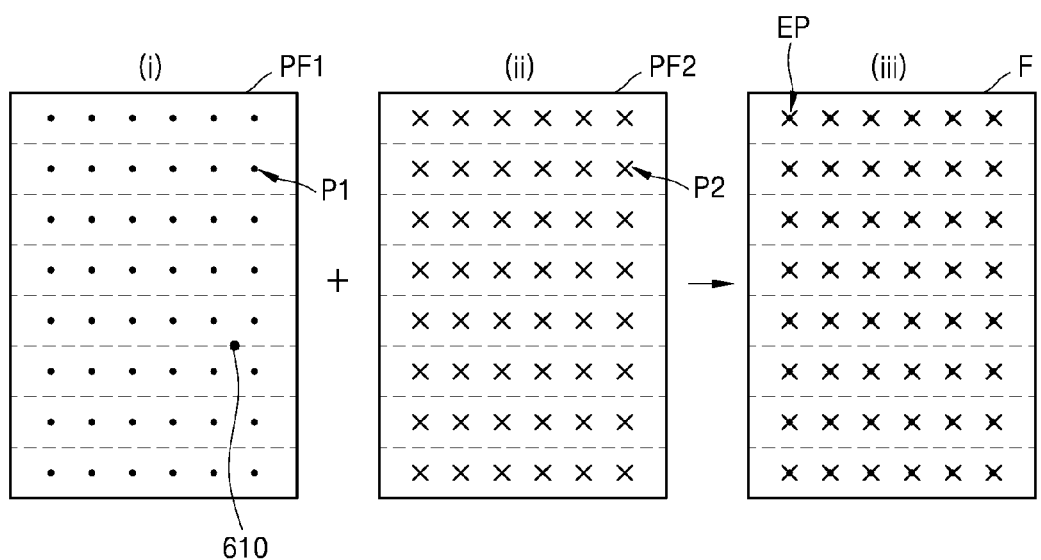
FIG. 10 is a reference diagram illustrating a method of obtaining a frame according to an embodiment.

FIG. 10 is a reference diagram illustrating a method of obtaining a frame according to an embodiment. As shown in FIG. 10(*i*), the processor 130 may obtain a first initial frame PF1 from first scanning data, and as shown in FIG. 10(*ii*), may obtain a second initial frame PF2 from second scanning data.

Meanwhile, an arbitrary target point 610 is included in the first initial frame PF1 but the arbitrary target point 610 may not be included in the second initial frame PF2. The target point 610 may be determined as an ineffective target point when a correlation is applied to the first initial frame PF1 and the second initial frame PF2. The target point 610 may be provided by the LiDAR device 100 and may have the same optical information as the first light $L_1$, but the processor 130 may apply the correlation to the first initial frame PF1 and the second initial frame PF2 to determine the target point 610 as noise.

Thus, the processor 130 may obtain a frame F excluding the ineffective target point 610, as shown in FIG. 10 (*iii*). As described above, for example, the processor 130 may obtain the frame F including effective target points EP which are average values of depth information of corresponding target points of the first initial frame PF1 and the second initial frame PF2. FIG. 10 (*iii*) shows a frame when the respective target points P1 and P2 of the first and second initial frames PF1 and PF2 match but the disclosure is not limited thereto. The respective target points P1 and P2 of the first and second initial frames PF1 and PF2 may not match.

Figure 11:
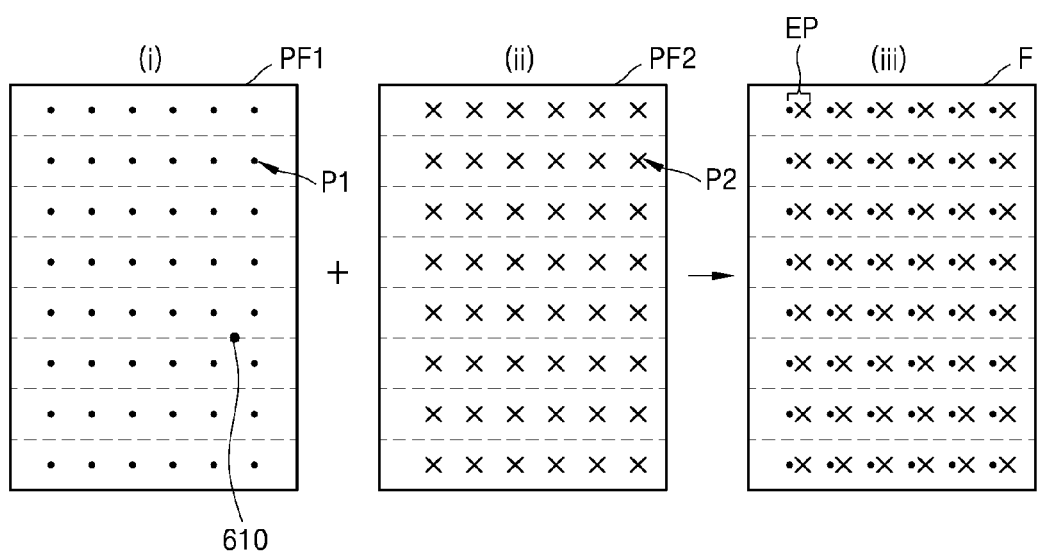
FIG. 11 is a reference diagram illustrating a method of obtaining a frame according to another embodiment.

FIG. 11 is a reference diagram illustrating a method of obtaining a frame according to another embodiment. As shown in FIGS. 11 (*i*) and (*ii*), the first and second initial frames PF1 and PF2 may not respectively match the target points P1 and P2. The processor 130 may determine the effective target point EP by applying a correlation to the first initial frame PF1 and the second initial frame PF2. As shown in FIG. 11 (*iii*), the processor 130 may obtain a frame F including depth information of the effective target point EP. The obtained frame F may have a higher spatial resolution than the first and second initial frames PF1 and PF2.

The processor 130 obtains the frame F by distinguishing first and second scanning data, but is not limited thereto. The processor 130 may obtain the frame F without distinguishing the first and second scanning data. For example, the processor 130 may obtain the frame F using a scan period.

Figure 12:
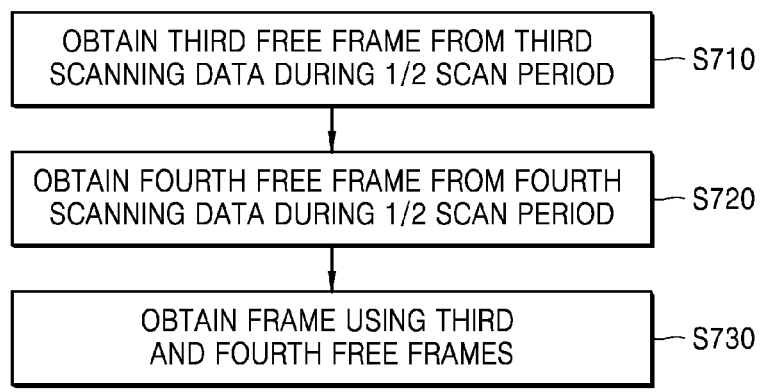
FIG. 12 is a flowchart illustrating a method of obtaining a frame according to another embodiment.
Figure 13:
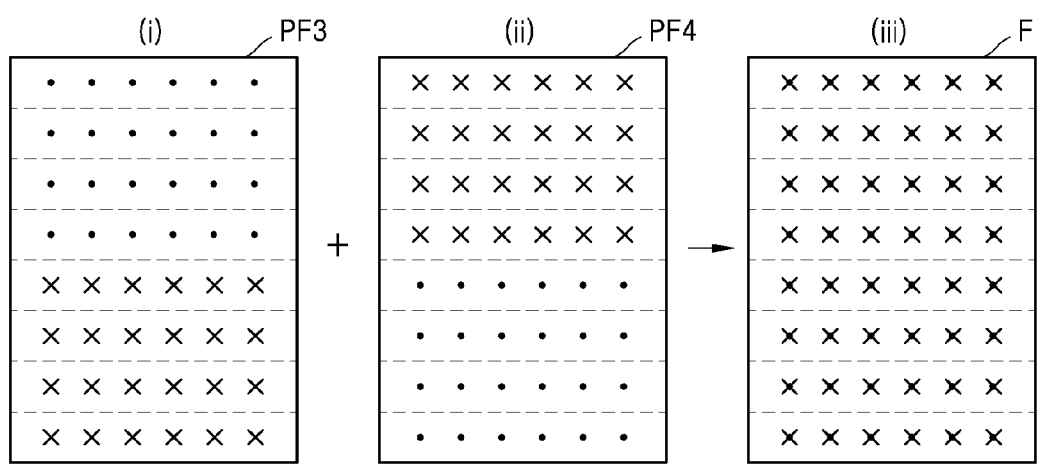
FIG. 13 is a reference diagram illustrating the method of obtaining the frame of FIG. 12.

FIG. 12 is a flowchart illustrating a method of obtaining a frame according to another embodiment. FIG. 13 is a reference diagram illustrating the method of obtaining the frame of FIG. 12.

The processor 130 may receive third scanning data from the light receiver 120 during a ½ scan period to obtain a third initial frame (S710). The third scanning data may include first scanning data based on the first light $L_1$ and second scanning data based on the second light $L_2$. For example, the light scanner 250 may bisect the scan range 11 in the vertical direction, scan the upper region of the scan range 11 with the first light $L_1$ during the ½ scan period, and scan the lower region of the scan range 11 with the second light $L_2$. The light receiver 120 may detect the first target light $L_{11}$ and the second target light and $L_{22}$ reflected in the scan range 11 and correspondingly output the first and second scanning data including depth information.

The processor 130 may determine positions of target points of the first and second scanning data in consideration of the position of a pixel that detected the first light $L_1$ or the second lights $L_2$ in the light detector 310, the incidence direction of the first and second lights $L_1$ and $L_2$, scan information (e.g., the tilt angle of the reflective surface 251, the scan period, the number of the reflective surfaces 251, etc.) of the light scanner 250, etc. As shown in FIG. 13 (*i*), the processor 130 may obtain a third initial frame PF3. For example, the processor 130 may obtain the third initial frame PF3 including a first region based on the first scanning data and a second region based on the second scanning data.

In addition, the processor 130 may receive fourth scanning data from the light receiver 120 during a next ½ scan period. The fourth scanning data may include the first scanning data based on the first light $L_1$ and the second scanning data based on the second light $L_2$. As shown in FIG. 13 (*ii*), the processor 130 may obtain a fourth initial frame PF4 including the first region based on the second scanning data and the second region based on the first scanning data.

In addition, the processor 130 may obtain a frame using the third initial frame PF3 and the fourth initial frame PF4. For example, the processor 130 may obtain the frame F by applying a correlation to the third initial frame PF3 and the fourth initial frame PF4. FIG. 13 (*iii*) shows the frame F obtained from the third initial frame PF3 and the fourth initial frame PF4. As described above, when the light scanner 250 scans a region in which the first and second lights $L_1$ and $L_2$ do not overlap each other during the ½ scan period, the processor 130 may obtain the frame F without distinguishing the first and second lights $L_1$ and $L_2$. The obtaining of the frame F described above may not only improve crosstalk but also increase a temporal resolution.

Figure 14:
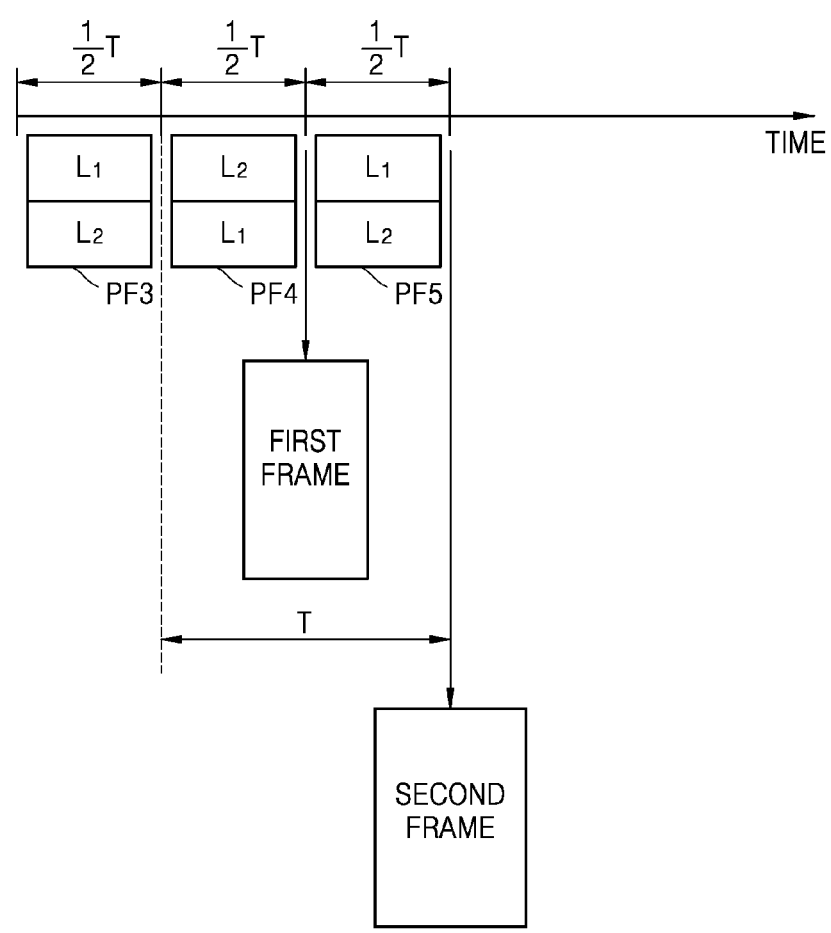
FIG. 14 is a reference diagram illustrating a frame obtaining method of increasing temporal resolution according to an embodiment.

FIG. 14 is a reference diagram illustrating a method of obtaining a frame with an increased temporal resolution according to an embodiment. When the light scanner 250 scans a region in which the first light $L_1$ and the second light $L_2$ do not overlap each other during a ½ scan period T/2, the processor 130 may obtain the initial frames F3, PF4, and PF5 at an interval of the ½ scan period T/2. Thus, at one scan time after starting scanning, the processor 130 may obtain a first frame from the two initial frames PF3 and PF4. In addition, the processor 130 may obtain another initial frame PF5 during the next ½ scan time T/2, thereby obtaining a second frame from the two initial frames PF4 and PF5. That is, the processor 130 may obtain a frame every ½ scan time, and thus the time for obtaining the frame is shorter than the scan period. Thus, a LiDAR device according to an embodiment may increase the temporal resolution.

Figure 15:
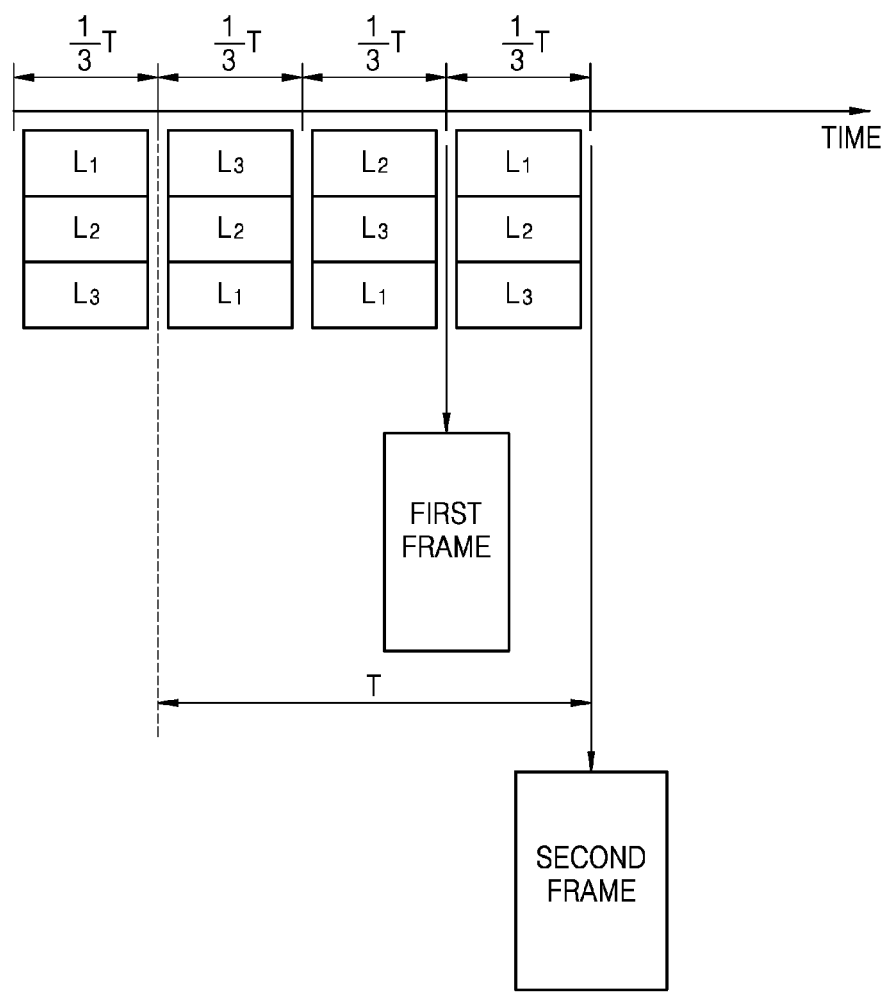
FIG. 15 is a reference diagram illustrating a method of obtaining a frame with an increased temporal resolution according to another embodiment.

The temporal resolution may be proportional to the number of lights provided. FIG. 15 is a reference diagram illustrating a method of obtaining a frame with an increased temporal resolution according to another embodiment. When the light scanner 250 scans a region in which first to third lights do not overlap each other during a ⅓ scan period T/3, the processor 130 may obtain an initial frame at an interval of the ⅓ scan period T/3. Thus, the processor 130 may obtain a first frame at one scan time after starting scanning but may obtain a second frame at the next ⅓ scan time. Thus, the processor 130 may acquire frames at intervals of ⅓ scan period (T/3), so that the temporal resolution may be increased.

The method of controlling the LiDAR device 100 according to the certain embodiments may include the processor 130, a memory for storing program data and executing the program data, a permanent storage unit such as a disk drive, a communications port for handling communication with external devices, and user interface devices, including a touch panel, keys, buttons, etc., for receiving input information and outputting output information. For example, when software modules or algorithms are involved, these software modules may be stored as computer-readable code executable on the processor 130 or program instructions in a computer-readable recording medium. Examples of the computer-readable recording medium include magnetic storage media (e.g., read-only memory (ROM), random-access memory (RAM), floppy disks, hard disks, etc.), and optical recording media (e.g., CD-ROM, or digital versatile disc (DVD)). The computer-readable recording medium may also be distributed over network-coupled computer systems so that the computer-readable code is stored and executed in a distributive manner. The media may be read by the computer, stored in the memory, and executed by the processor 130.

Certain embodiments may be described in terms of functional block components and various processing steps. Such functional blocks may be realized by any number of hardware and/or software components configured to perform the specified functions. For example, certain embodiments may employ various integrated circuit (IC) components, e.g., memory elements, processing elements, logic elements, look-up tables, and the like, which may carry out a variety of functions under the control of the one or more microprocessors or other control devices. Similarly, where the elements are implemented using software programming or software elements, certain embodiments may be implemented with any programming or scripting language such as C, C++, Java, assembler language, or the like, with the various algorithms being implemented with any combination of data structures, objects, processes, routines or other programming elements. The functional blocks may be implemented in algorithms that are executed on the one or more processors 130. Furthermore, certain embodiment described herein could employ any number of conventional techniques for electronics configuration, signal processing and/or control, data processing and the like. The words "mechanism", "element", "means", and "configuration" are used broadly and are not limited to mechanical or physical embodiments. The words may include software routines in conjunction with the processor 130, etc.

The particular implementations shown and described herein are illustrative examples and are not intended to otherwise limit the scope of the disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

It should be understood that certain embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A Light Detection And Ranging (LiDAR) device comprising:
   a light scanner configured to periodically scan a region in a surrounding area by sequentially changing a traveling path of incident light;
   a first light source configured to provide first light to the light scanner in a first incidence direction; and
   a second light source configured to provide second light to the light scanner in a second incidence direction different from the first incidence direction, and
   wherein the light scanner is further configured to scan the region in the surrounding area a plurality of times during one scan period of the light scanner using the first light and second light,
   wherein the first light source is configured to provide the first light in the first incidence direction on a first surface of the light scanner, and the second light source is configured to provide the second light in the second incidence direction on a second surface of the light scanner different from the first surface of the scanner,
   wherein the light scanner comprises a plurality of reflective surfaces, each of the plurality of reflective surfaces is parallel to a central axis of the light scanner or is inclined with respect to the central axis of the light scanner,
   wherein the second light source is configured to emit the second light to a second reflective surface different from a first reflective surface among the plurality of reflective surfaces, while the first light source is configured to provide the first light to the first reflective surface among the plurality of reflective surfaces, wherein the first reflective surface scans a first sub-region of the region in the surrounding area by reflecting the first light sequentially in different directions, and wherein the second reflective surface scans a second sub-region of the region in the surrounding area different from the first sub-region by reflecting the second light sequentially in different directions.

2. The LiDAR device of claim 1, wherein the first light source and the second light source are configured to intermittently provide the first and second lights to the light scanner.

3. The LiDAR device of claim 2, wherein the first light source and the second light source are configured to provide the first light and the second light to the light scanner simultaneously or alternately.

4. The LiDAR device of claim 1, wherein the light scanner is further configured to sequentially change the traveling path of the incident light by rotating the light scanner with respect to a central axis of the light scanner.

5. The LiDAR device of claim 4, wherein a scan period of the light scanner is less than or equal to a rotation period of the light scanner.

6. The LiDAR device of claim 1, wherein a first reflective surface of the plurality of reflective surfaces has a first tilt angle, and a second reflective surface of the plurality of reflective surfaces has a second tilt angle that is different from the first tilt angle.

7. The LiDAR device of claim 1, wherein adjacent reflective surfaces among the plurality of reflective surfaces have different tilt angles.

8. The LiDAR device of claim 1, wherein the first sub-region and the second sub-region do not overlap each other.

9. The LiDAR device of claim 1, wherein the first sub-region and the second sub-region are arranged in parallel with a rotation axis of the light scanner.

10. The LiDAR device of claim 1, further comprising:

a light receiver configured to:
    detect third light reflected in the region of the surrounding area from the first light, and
    detect fourth light reflected in the region of the surrounding area from the second light; and a processor configured to obtain a frame comprising depth information of the region of the surrounding area by using a result of detection from the light receiver.

11. The LiDAR device of claim 10, wherein the processor is further configured to obtain a first initial frame comprising the depth information of the region of the surrounding area corresponding to the first light and a second initial frame comprising the depth information of the region of the surrounding area corresponding to the second light in the result of detection from the light receiver and obtain the frame using the first and second initial frames.

12. The LiDAR device of claim 11, wherein the processor is further configured to obtain the frame by applying a correlation to the first and second initial frames.

13. The LiDAR device of claim 10, wherein the processor is further configured to:

obtain a third initial frame comprising the depth information of the region in the surrounding area by using the result of detection from the light receiver during a first time, obtain a fourth initial frame comprising the depth information of the region in the surrounding area by using the result of detection from the light receiver during a second time that is subsequent to the first time, and obtain the frame using the third and fourth initial frames.

14. The LiDAR device of claim 13, wherein each of the third and fourth initial frames comprises depth information corresponding to both the first light and the second light.

15. The LiDAR device of claim 13, wherein a magnitude of the first and second times is equal to a ½ scan period of the light scanner.

16. A method of operating a Light Detection And Ranging (LiDAR) device, the method comprising:

providing first light and second light to a light scanner; and scanning, by the light scanner, a region in a surrounding area a plurality of times with the first light and the second light during one scan period of the light scanner by sequentially changing traveling paths of the first and second lights, wherein the scanning comprises scanning a second sub-region of the region in the surrounding area that does not overlap a first sub-region of the region in the surrounding area with the second light while scanning the first sub-region of the region in the surrounding area with the first light, wherein the providing the first light and the second light to the light scanner comprises:

providing the first light to the light scanner in a first incidence direction on a first surface of the light scanner, and providing the second light to the light scanner in a second incidence direction on a second surface of the light scanner different from the first surface of the scanner, the second incidence direction being different from the first incidence direction, wherein the light scanner comprises a plurality of reflective surfaces, each of the plurality of reflective surfaces is parallel to a central axis of the light scanner or is inclined with respect to the central axis of the light scanner, and wherein the providing the first light and the second light to the light scanner comprises:

emitting, by a second light source, the second light to a second reflective surface different from a first reflective surface among the plurality of reflective surfaces, while providing, by a first light source, the first light to the first reflective surface among the plurality of reflective surfaces, and wherein the scanning comprises:

scanning, by the first reflective surface, a first sub-region of the region in the surrounding area by reflecting the first light sequentially in different directions, and scanning, by the second reflective surface, a second sub-region of the region in the surrounding area different from the first sub-region by reflecting the second light sequentially in different directions.

17. The method of claim 16, wherein the scanning further comprises scanning the second sub-region with the first light while scanning the first sub-region with the second light.

18. The method of claim 16,
wherein the providing comprises providing the first light and second light to the light scanner simultaneously or alternately.

19. The method of claim 16, further comprising:
detecting third light reflected in the region in the surrounding area from the first light,
detecting fourth light reflected in the region in the surrounding area from the second light; and
obtaining a frame comprising depth information of the region in the surrounding area by using a result of detection.

20. The method of claim 19,
wherein the obtaining of the frame comprises:
   obtaining a first initial frame comprising the depth information of the region in the surrounding area corresponding to the first light and a second initial frame comprising the depth information of the region in the surrounding area corresponding to the second light in the result of detection; and
   obtaining the frame using the first and second initial frames.

21. The method of claim 20,
wherein the frame is obtained by applying a correlation to the first and second initial frames.

22. An apparatus comprising:
a memory configured to store one or more instructions; and
a processor configured to execute the one or more instructions to:
   output a first signal to control a light scanner to periodically scan a region in a surrounding area a plurality of times during one scan period of a light scanner by sequentially changing a traveling path of incident of the first and second lights;
   output a second signal to control a first light source provide the first emitted light to the light scanner in a first incidence direction;
   output a second signal to control a first light source provide the first emitted light to the light scanner in a first incidence direction;
   output a second signal to control a first light source provide the first emitted light to the light scanner in a first incidence direction;
   detect first reflected light reflected in the region in the surrounding area from first emitted light;
   detect second reflected light reflected in the region in the surrounding area from second emitted light; and
   obtain a frame comprising depth information of the region in the surrounding area based on the detected first reflected light and the detected second reflected light.

* * * * *